(12) United States Patent
Clark et al.

(10) Patent No.: US 7,337,746 B2
(45) Date of Patent: Mar. 4, 2008

(54) SMALL ANIMAL FEEDING STATION

(76) Inventors: Peg Clark, 5190 W. Fairchild Rd., Kuna, ID (US) 83634; Anna Wiemann, 5190 W. Fairchild Rd., Kuna, ID (US) 83634

(*) Notice: Subject to any disclaimer, the term of this patent is extended or adjusted under 35 U.S.C. 154(b) by 272 days.

(21) Appl. No.: 11/179,209

(22) Filed: Jul. 12, 2005

(65) Prior Publication Data

US 2007/0012254 A1    Jan. 18, 2007

(51) Int. Cl.
*A01K 9/00* (2006.01)
*A61J 9/06* (2006.01)
*A47D 15/00* (2006.01)

(52) U.S. Cl. .................... 119/71; 119/515; 248/105

(58) Field of Classification Search ............ 119/71, 119/477, 454, 475, 515, 521, 464, 51.01, 119/51.5, 51.03; 248/105, 103, 133, 371
See application file for complete search history.

(56) References Cited

U.S. PATENT DOCUMENTS

| | | | | |
|---|---|---|---|---|
| D45,362 S | * | 3/1914 | Woodside | D7/313 |
| 1,630,982 A | * | 5/1927 | Stone | 119/71 |
| 2,391,264 A | | 12/1945 | Nickelson | 248/103 |
| 2,506,205 A | * | 5/1950 | Fry | 119/71 |
| 2,575,056 A | * | 11/1951 | Jones | 248/103 |
| 2,670,165 A | * | 2/1954 | Dominguez | 248/103 |
| 2,946,308 A | * | 7/1960 | Harris | 119/477 |
| 3,042,002 A | * | 7/1962 | Liell | 119/71 |
| 3,281,016 A | * | 10/1966 | Thompson et al. | 222/103 |
| D217,472 S | | 5/1970 | Lovitz | D30/13 |
| 3,589,338 A | | 6/1971 | Lovitz | 119/51 |
| 3,699,925 A | * | 10/1972 | Van Dongen | 119/475 |
| 3,938,769 A | | 2/1976 | Wetherbee | 248/312 |
| D249,076 S | | 8/1978 | Meeker et al. | D30/14 |

(Continued)

FOREIGN PATENT DOCUMENTS

EP    30799 A2 *    6/1981

OTHER PUBLICATIONS

Three pages: E-mail regarding, and print-out of, http://www.ascott.biz/item1931.htm web site regarding "Four Bottle Rack Feeding System", dated Mar. 29, 2005 and May 24, 2005.

(Continued)

*Primary Examiner*—Yvonne R. Abbott
(74) *Attorney, Agent, or Firm*—Pedersen & Co., PLLC; Ken J. Pederson; Barbara S. Pedersen

(57) ABSTRACT

A feeding station for dispensing food or water to small animals. The feeding station having two support members at an angle to one another, and a plurality of apertures in said support members in sets of upper and lower cooperating apertures. A bottle having an angular configuration is adapted to be inserted in said apertures in the support members. The angle or bend in the bottle abuts against one of the support members preventing the bottle from "falling out" of the feeding station. The bottle are further retained in the housing by abutting against the other support member and a resilient strap from above, which permits the lamb or other small animal t o "bunt" the bottle to simulate natural feeding. The feeding station is adapted to mounted on a vertical member and feed more than one small animal at a time.

18 Claims, 9 Drawing Sheets

U.S. PATENT DOCUMENTS

| | | | |
|---|---|---|---|
| 4,173,948 A | 11/1979 | Austin | 119/72 |
| 4,278,225 A * | 7/1981 | Phelps | 248/311.3 |
| 4,389,977 A * | 6/1983 | Borak | 119/72.5 |
| 4,393,813 A | 7/1983 | Sou | 119/72.5 |
| 4,676,387 A | 6/1987 | Stephenson et al. | 215/11 R |
| 4,807,567 A | 2/1989 | Atchley | 119/18 |
| 4,989,545 A * | 2/1991 | Sheaffer et al. | 119/419 |
| 5,010,847 A * | 4/1991 | Braden | 119/475 |
| D332,670 S * | 1/1993 | McFarland | D28/38 |
| D337,863 S | 7/1993 | Bowell | D30/132 |
| RE34,725 E | 9/1994 | Braden | 119/18 |
| D355,510 S * | 2/1995 | Duncan | D30/133 |
| 5,549,074 A * | 8/1996 | Hui | 119/477 |
| 5,681,019 A * | 10/1997 | Boyce | 248/229.11 |
| 5,704,495 A * | 1/1998 | Bale et al. | 211/71.01 |
| D392,776 S * | 3/1998 | Trossevin et al. | D30/121 |
| 5,816,193 A * | 10/1998 | Haggerty | 119/71 |
| 5,893,338 A * | 4/1999 | Campbell et al. | 119/475 |
| 6,142,100 A | 11/2000 | Marchioro | 119/54 |
| 6,345,723 B1 * | 2/2002 | Blake et al. | 211/74 |
| 6,684,815 B1 * | 2/2004 | Rakoczy | 119/72 |
| 6,817,314 B1 | 11/2004 | Conte | 119/72.5 |
| 6,923,332 B1 * | 8/2005 | Thomas | 215/11.1 |
| D520,322 S * | 5/2006 | Orlando | D8/70 |
| 7,100,782 B2 * | 9/2006 | Hanna | 215/11.6 |
| 7,121,229 B2 * | 10/2006 | Hong | 119/421 |

OTHER PUBLICATIONS

Four pages from http://www.jefferslivestock.com/ssc/products.asp?CID=2&area=goat&dept_id=205, dated Apr. 20, 2005.

* cited by examiner

SMALL ANIMAL FEEDING STATION

BACKGROUND OF THE INVENTION

FIELD OF THE INVENTION

The present invention relates to a feeding station, and, more particularly to a feeding station for dispensing liquid to small animals or pets.

SUMMARY OF THE INVENTION

The present invention relates to a water and/or liquid feeding station for small pets or animals. In the preferred embodiment, the feeding station comprises a housing having a plurality of apertures for receiving one or more feeding bottles in a stable, yet resilient manner. The bottles are preferably angular in configuration, in order to facilitate the liquid flowing from the bottle. In the preferred embodiment, apertures are disposed in a retaining plate and a support plate which are oriented at an angle to one another, such that the apertures in the retaining plate are generally aligned with the apertures in the support plate, so that when the bottle is inserted in the housing a portion of the bottle is retained in the interior space between the retaining plate and the support plate. The bottles are preferably "slid" in from the top of the housing through the apertures in the support plate and into the apertures in the retaining plate. The bottles may be further retained in the housing by a resilient rubber strap from above, which permits the lamb or other small animal to "bunt" the bottle without injury to itself, and in addition, a properly controlled flow of milk is provided under conditions simulating the natural feeding of a lamb.

The preferred feeding station is easy to manufacture and provides substantial structure in order to prevent the bottles from being dislodged from the feeding station. The feeding station allows the user to easily insert and remove the bottles from the housing without requiring the opening of brackets, latches, or other clamping means, so that minimal time is required when feeding the animals.

Some embodiments of the invention may be described as a feeding station for holding at least one bottle for holding liquid, the bottle having an angled main body. The feeding station comprises an upper plate having a generally cylindrical upper aperture. The upper aperture having a first central axis perpendicular to the plane of the upper plate. The feeding station further comprises a lower plate having a generally cylindrical lower aperture. The lower aperture having a second central axis perpendicular to the plane of the lower plate. The upper and lower plates are at an angle to each other ranging from 30-60 degrees to each other, and the first axis and second axis intersect in an interior space between the upper and lower plate.

DESCRIPTION OF THE PREFERRED EMBODIMENTS

Figure 1:
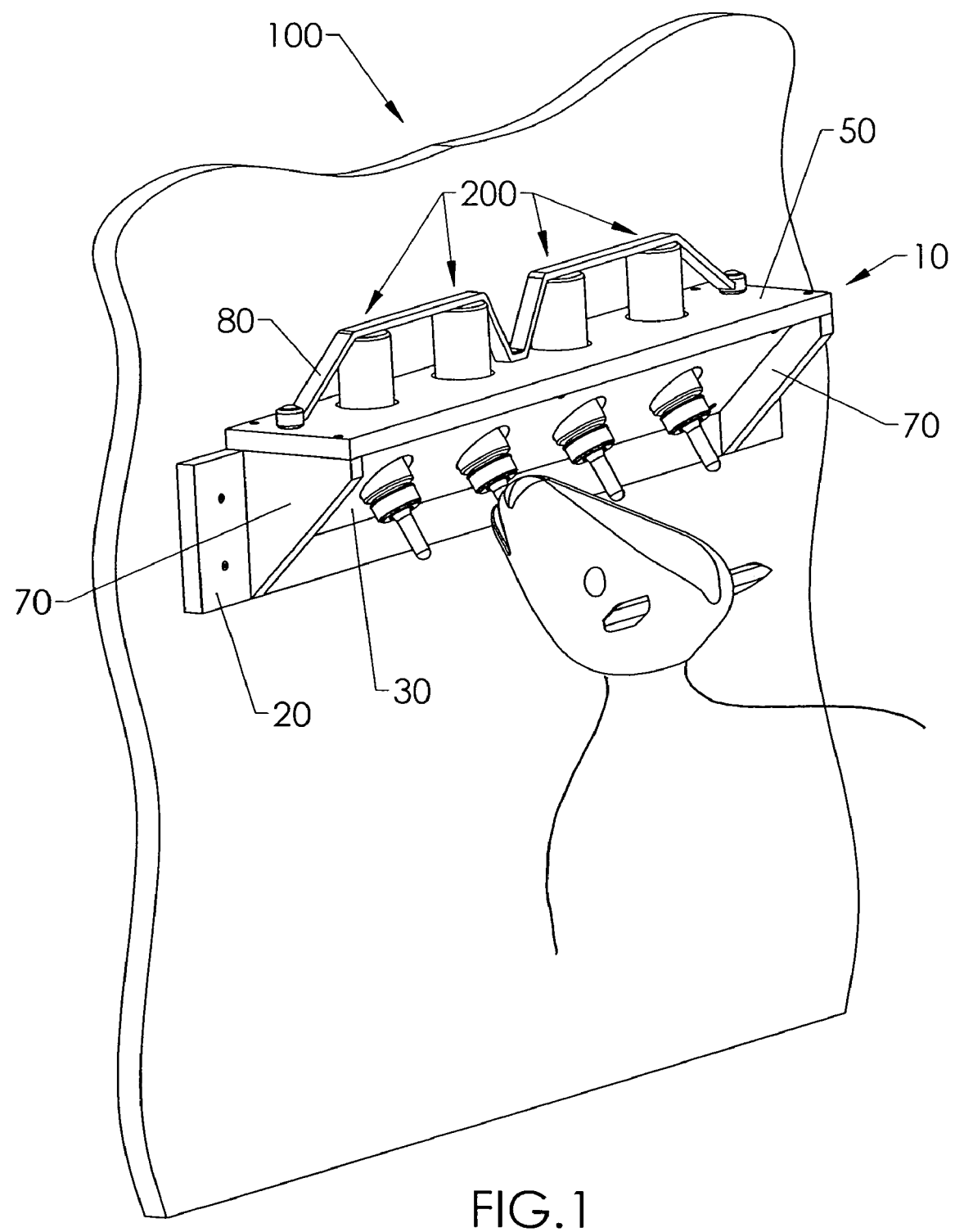
FIG. 1 is an illustration of the manner in which a small animal feeds from one embodiment of the invented feeding station.
Figure 2:
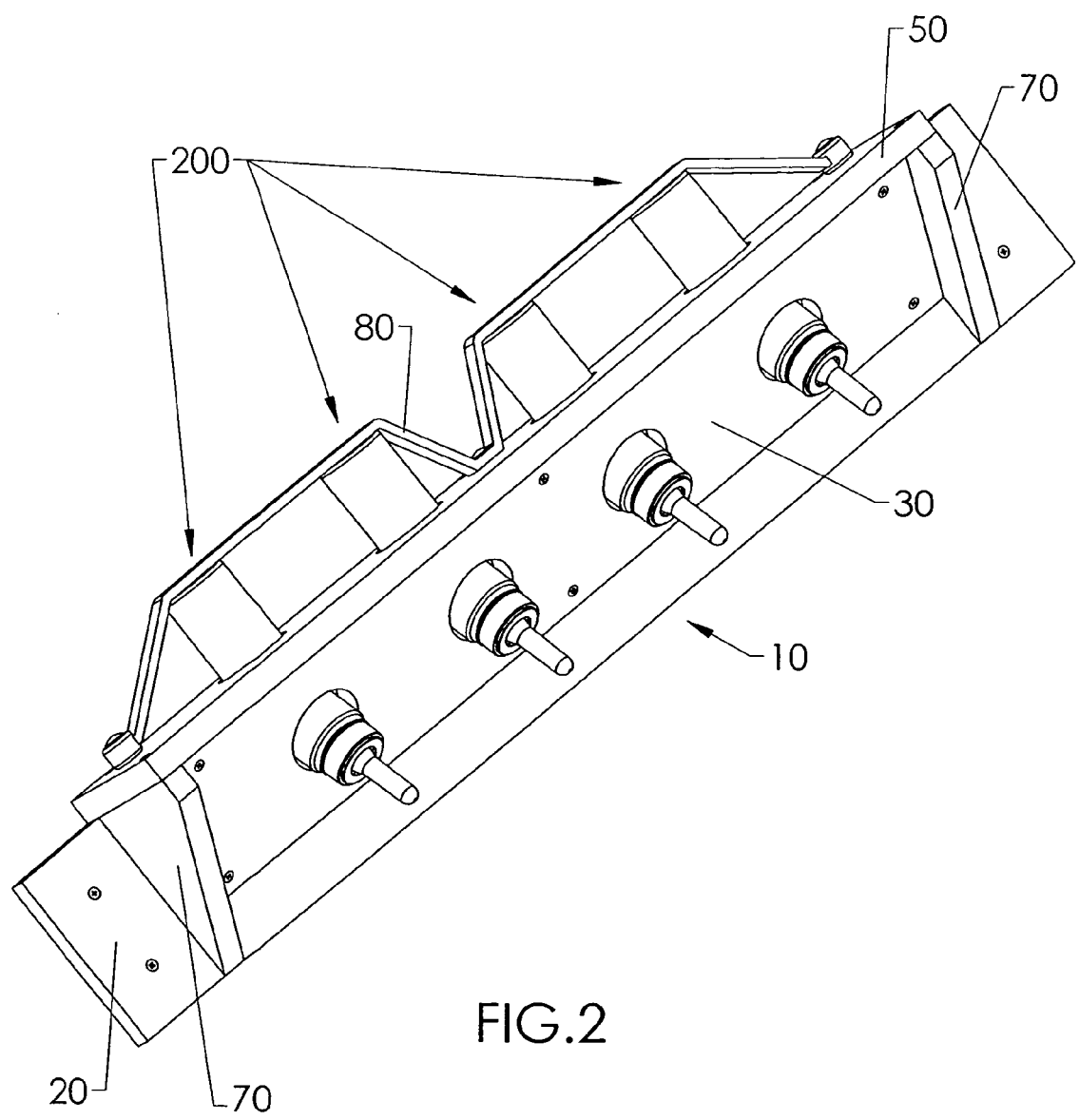
FIG. 2 is a perspective view of the embodiment shown in FIG. 1.

Referring to the figures, there is shown one, but not the only, embodiment of the invented feeding station 100 for small animals. As shown in FIGS. 1 and 2, the feeding station 100 comprises a housing 10 for receiving a plurality of angular bottles 200 for feeding small animals, in particular lambs, whereby the lamb(s) or other small animal(s) may feed itself without requiring an attendant. In a broad context, the housing 10 comprises a plurality of apertures 40, 60 for retaining a plurality of bottles 200 in a stable, yet resilient manner. In the preferred embodiment, apertures 40, 60 are disposed in a retaining plate 30 and a top support plate 50, respectively, which are oriented at an angle to one another, generally corresponding to and preferably slightly greater than, the angle of the bottles 200, to prevent the bottles 200 from "falling out". The bottles 200 are preferably "slid" in from the top of the housing through the apertures 60 in the top support plate 50 and into the apertures 40 in the retaining plate 30. The bottles 200 are further retained in the housing 100 by a resilient rubber strap 80 from above, which permits the lamb or other small animal to "bunt" the bottle 200 without injury to itself, and in addition, a properly controlled flow of milk is provided under conditions simulating the natural feeding of a lamb. The apertures 60 in the top support plate 50 keep the bottles 200 in a generally vertical position, while the apertures 40 in the retaining plate 30 prevent the bottles 200 from "sliding out" of the housing.

Figure 3:
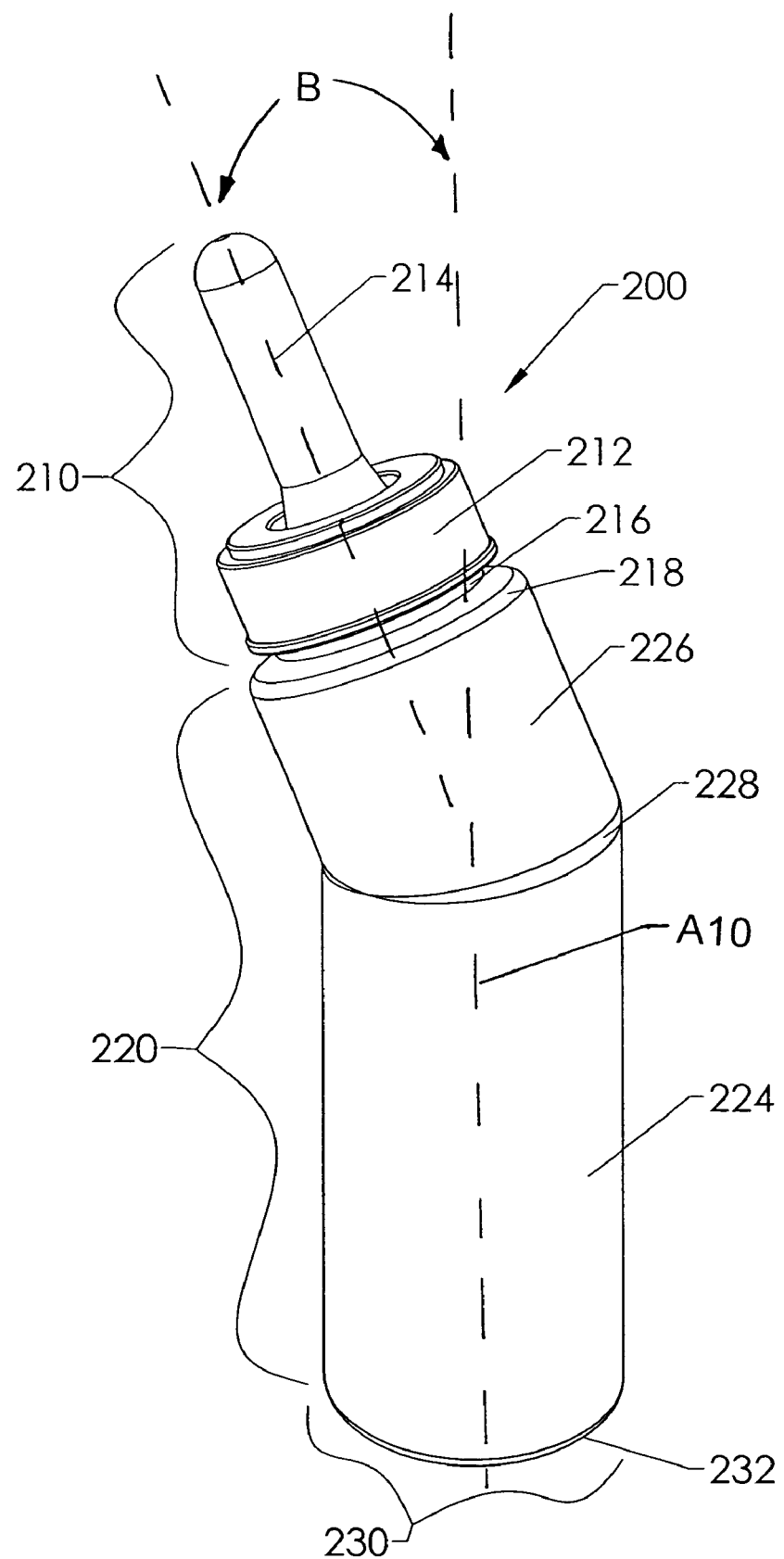
FIG. 3 is a side view of one embodiment of an angular bottle.
Figure 4:
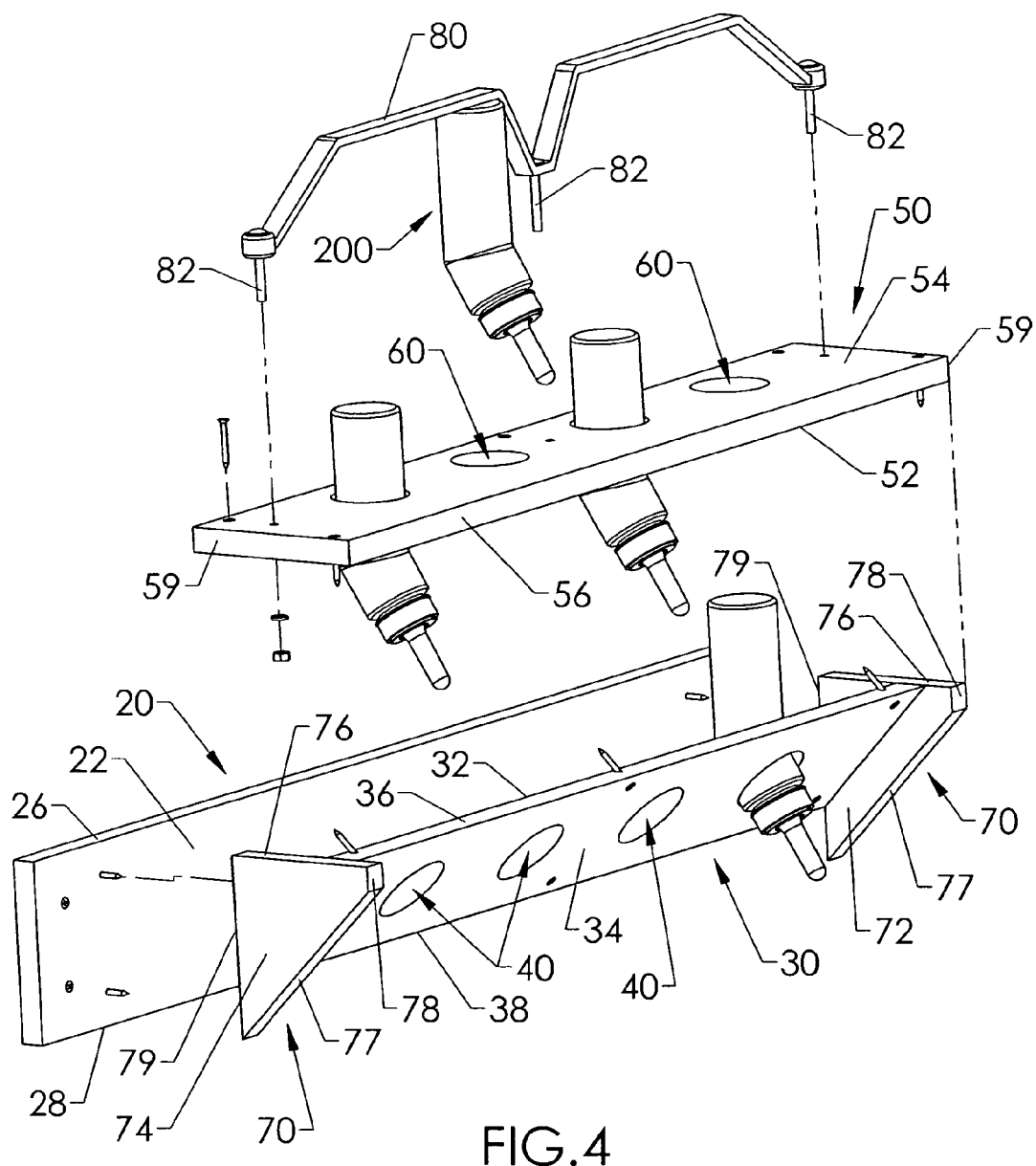
FIG. 4 is an exploded view of the embodiment shown in FIGS. 1 and 2.
Figure 5:
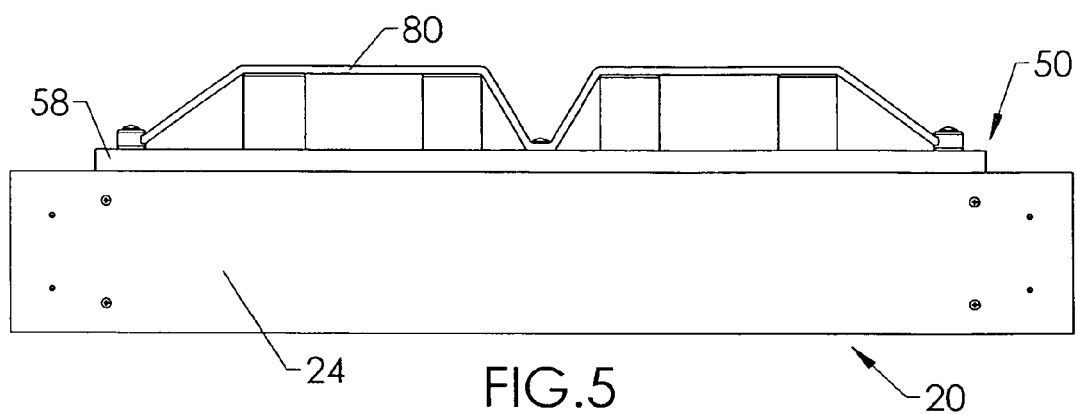
FIG. 5 is a rear view of the embodiment shown in FIGS. 1, 2 and 4.
Figure 6:
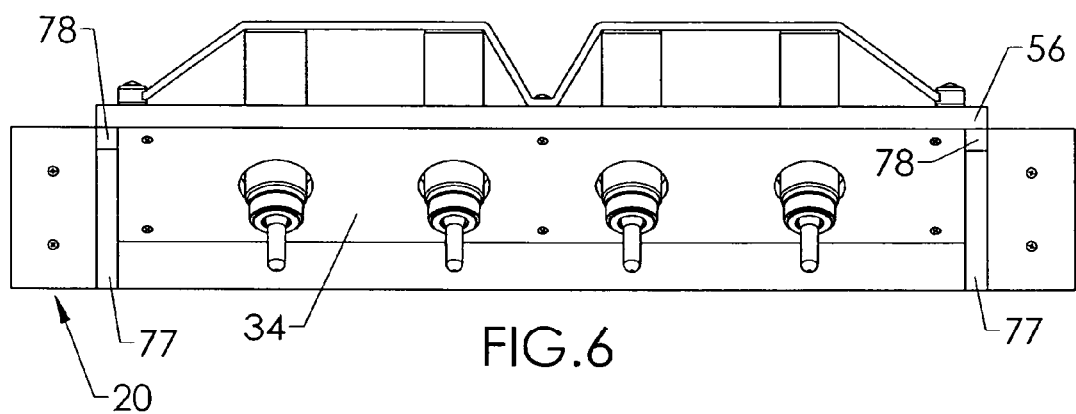
FIG. 6 is a front view of the embodiment shown in FIGS. 1, 2, 4 and 5.
Figure 7:
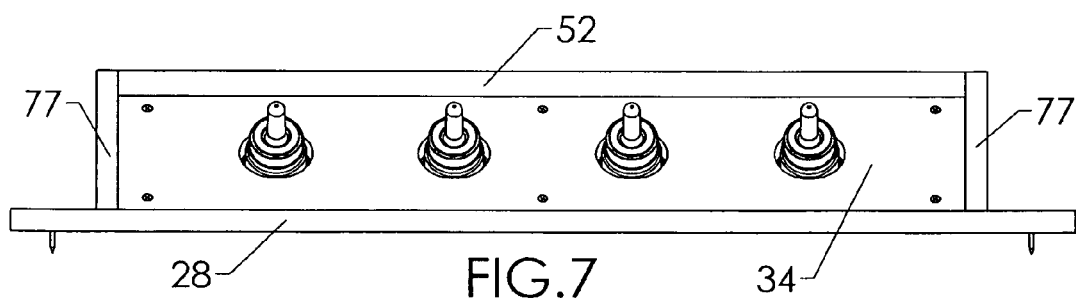
FIG. 7 is a bottom view of the embodiment shown in FIGS. 1, 2 and 4-6.

As shown in FIG. 3, the preferred bottle(s) 200 has an angular configuration having a first end 210, a main body portion 220, and a second end 230. The bottle 200 may be made of glass, plastic, or other durable material. Preferably, the first end 210 comprises a screw cap 212 and a nipple 214 adapted to be received in the screw cap 212, a neck portion 216 adapted to threadably engage the screw cap 212 and a shoulder portion 218. The nipple 214 sits tightly in the screw cap 212 to prevent leakage from the bottle 200. The nipple 214 is preferably flexible and comprises an annular skirt (not shown) which elastically seats within the screw cap 212 to prevent the nipple 214 from being pulled from the bottle 200. Optionally, a check valve may be disposed within the nipple 214 to simulate natural feeding and to permit easy flow of milk from the bottle 200 into the nipple 214, but restrict reverse flow back into the bottle 200. The second end 230 is preferably a flat bottom portion 232.

The main body 220 of the bottle 200 includes an upper portion 224, a lower portion 226 and a bend 228 between the upper 224 and lower 226 portions, so that the lower portion 226 is configured to be at an angle to the upper portion 224. Preferably, the bend 228 or angle in the main body 220 of the bottle 200 is nearer the first end 210 of the bottle 200 than the second end 230. The main body 220 of the bottle 200 is preferably generally cylindrical and may be of uniform diameter from top to bottom; however, that is not a necessary requirement, the upper portion 224 of the main body 220 may be a different diameter from the lower portion 226 of the bottle 200. Additionally, either portion 224 or 226 may have a non-uniform circumference, for example the main body 220 of the bottle 200 may have decorative or utilitarian protrusions. The embodiment of the bottle 200 illustrated in the Figures has a circumference of 16 cm; however, other sized bottles having different circumferences and/or different lengths may be manufactured depending on the amount of liquid needing to be dispensed.

The bend 228 in the bottle 200 preferably forms an acute angle B between 0 degrees and 89 degrees relative to an axis A10 through the main body 220 of the bottle 200 (see FIG. 3) and most preferably between 20-40 degrees. In the preferred embodiment, the lower portion 226 of the main body 220 is at an angle B of 30 degrees relative to the upper portion 224 of the main body 220. The lower portion 226 of the main body 220 is preferably not at an angle B of 90 degrees or greater relative to the upper portion 224 of the main body 220 because then the liquid would not flow easily from the bottle.

As shown in FIGS. 4-11, the preferred housing 10 is configured to receive a plurality of bottles 200 for feeding small animals. Alternatively, the housing 10 may be manufactured to be only a single feeder for feeding a single animal. The housing 10 made be made of wood, metal, plastic, or other substantially durable material. Preferably, the bottles used in combination with the housing 20 are the angular bottles 200. In the preferred embodiment, the housing comprises a mounting plate 20 having an inner face 22, an outer face 24, a top edge surface 26, and a bottom edge surface 28 (see FIGS. 4-7). The mounting plate 20 is adapted to be attached to a vertical member, for example, a feeding stall, a fence, a wall, or other type of support. The mounting plate 20 may be attached to the vertical member via hanging means, bolts, screws 15, or other securement means. Preferably, the mounting plate 20 is well secured to prevent the feeding animals from being able to dislodge to the feeding station 100.

As shown in FIGS. 4-7, the housing 10 further comprises a retaining plate 30 at an angle A1 (see FIGS. 9A and 9B) to the mounting plate 20; a top plate 50 perpendicular to the mounting plate 20 and coupled with the retaining plate 30 at an angle A2; and, two side plates 70 extending perpendicularly from the mounting plate 20 and adjacent the retaining plate 30. The mounting plate 20 comprises an inner face 22, an outer face 24, a top edge surface 26, and a bottom edge surface 28; the retaining plate 30 comprises an inner face 32, an outer face 34, a front edge surface 36, a rear edge surface 38, side edge surfaces 39, and apertures 40; the top plate 50 comprises an inner face 52, an outer face 54, a front edge surface 56, a rear edge surface 58, side edge surfaces 59, and apertures 60; and, the side plates 70 comprise and inner face 72, an outer face 74, a top edge surface 76, a bottom edge surface 77, a front edge surface 78, and a back edge surface 79. The housing 10 may additionally be manufactured with drain holes, for example, in the retaining plate 30 so that the feeding station 100 may be easily cleaned; the owner need only spray down the feeding station 100 and water would drain out of the interior space I through the drain holes in the housing 10.

Figure 9A:
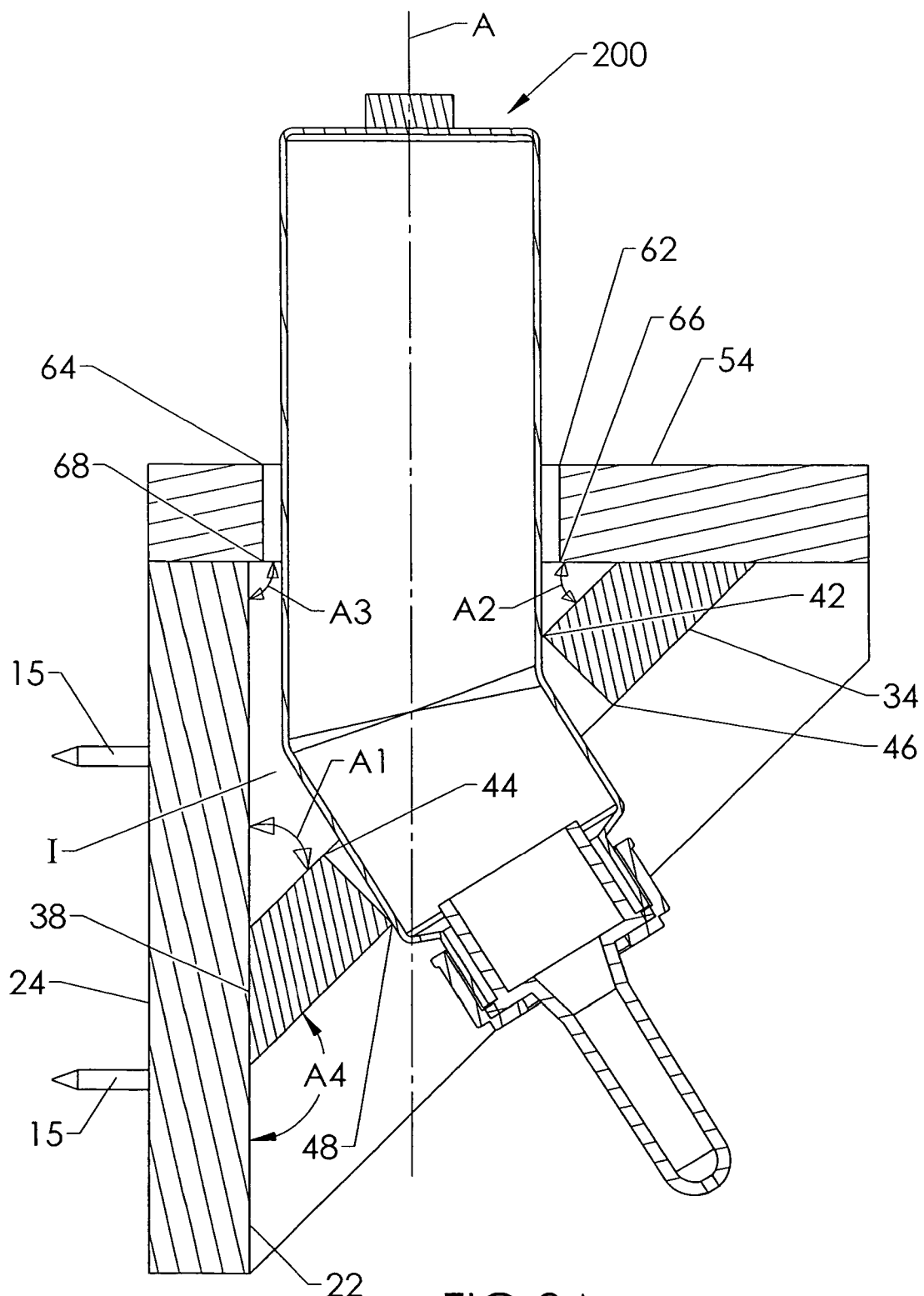
FIG. 9A is a cross-sectional view of the embodiment shown in FIG. 8, viewed along the line 9A-9A in FIG. 8.
Figure 9B:
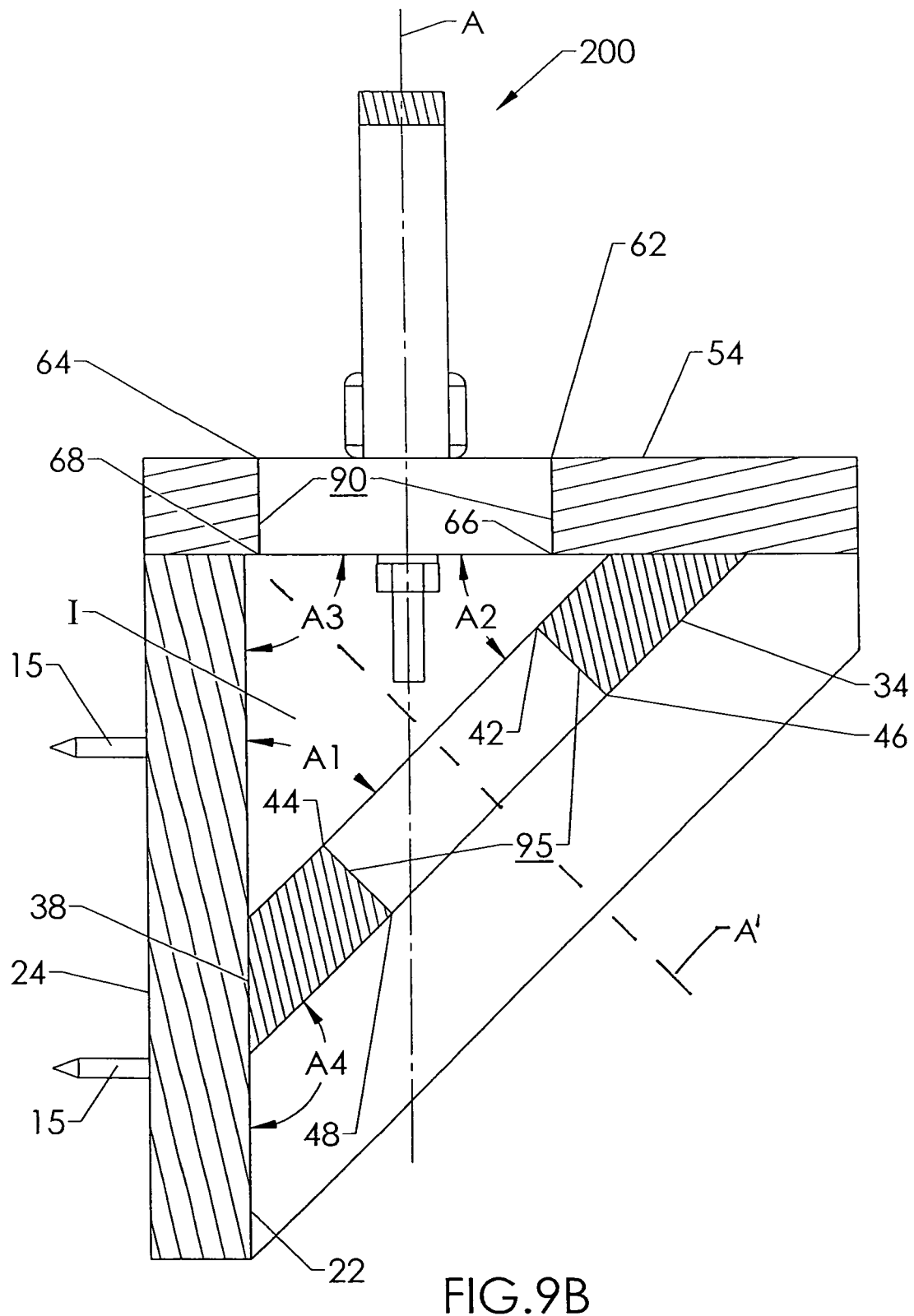
FIG. 9B is a cross-sectional view of the embodiment shown in FIGS. 8-9A with the bottle removed.

As shown in FIG. 9A, the rear edge surface 38 of the retaining plate 30 is connected to inner face 22 of the mounting plate 20 at an angle A1 of 45 degrees between the inner face 22 of the mounting plate 20 and the inner face 32 of the retaining plate 30; therefore, because the retaining plate 30 has parallel inner and outer surfaces, an angle A4 of 135 degrees is formed between the outer face 34 of the retaining plate and the inner face 22 of the mounting plate 20. The retaining plate 30 is secured to the mounting plate 20 with a plurality of screws 15. The inner face 52 of the top plate 50 is seated atop the front edge surface 36 of the retaining plate 30 and the top edge surface 26 of the mounting plate 20 forming an angle A3 of 90 degrees with the mounting plate 20. An angle A2 is formed between the inner face 32 of the retaining plate 30 and the inner face 52 of the top plate 50. The angles A1, A2, and A3 form a 45-45-90 degree right triangle with one another. The top plate 50 is secured to both the mounting plate 20 and retaining plate 30 via a plurality of screws 15. Preferably, the rear edge surface 38 and the front edge surface 36 of the retaining plate 30 are angled so as to be flush with the inner face 22 of the mounting plate 20 and the inner face 52 of the top plate 50.

While angles A1, A2 and A3 of 45-45-90 degrees respectively are preferred and convenient for manufacture, those angles may change especially in view of alternatively-angled bottles. For the preferred bottles 200 having an angle B, it is expected that angle A2 will be about 10-20 degrees greater than angle B, that it between 30 and 60 degrees. For example, for a bottle having an angle B of 30 degrees, angle A2 is preferably in the range of 40-50 degrees, and for a bottle having an angle B of 40 degrees, angle A2 is preferably between 50 and 60 degrees.

In the preferred embodiment, the housing 10 is also fitted with side plates 70. The inner faces 72 of the side plates 70 abut the side edge surfaces 39 of the retaining plate 30, so that the rear edge surfaces 79 of the of the side plates 70 are seated against the inner face 22 of the mounting plate 20. The inner face 52 of the top plate 50 extends to contact the top edge surfaces 76 of the side plates 70. The bottom edge surfaces 77 of the side plates 70 are preferably angled to match the angle of the retaining plate 30 relative to the mounting plate 20. The side plates 70 are secured to the housing 10 via a plurality of screws 15 that extend from the outer face 54 of the top plate 50 into the side plates 70 and from the rear face 24 of the mounting plate 20 into the side plates 70.

While other plates and plate arrangements may be used, this is the preferred arrangement of the plates 20, 30, 50, and 70 because it is the most advantageous arrangement for aligning the apertures 40 and 60 for receiving the preferred angular bottle 200. As shown to best advantage in FIGS. 9A and 9B, the angular arrangement of the top plate 50 and the retaining plate 30 aligns the apertures 40 and 60 so that they are generally vertically aligned with each other—the apertures 60 in the top plate 50 are above the apertures 40 in the retaining plate 30; therefore, the bottle 200 can easily slide from the aperture 60 in the top plate 50 into the aperture 40 in the retaining plate 30. Preferably, the axis A of the aperture(s) 60 in the top plate 50 passes through a portion of the aperture(s) 40 in the retaining plate 30 (see FIG. 9B). However, the two cooperating apertures 40, 60 are not coaxial. The apertures 40, 60 are cut so that the surfaces defining the apertures are perpendicular to their respective plate's inner and outer faces, and the center planes of each aperture is parallel to its respective plate's inner and outer faces. The center axes (A, A'—see to best advantage in FIG. 9B) of the cooperating apertures 40, 60 intersect inside the interior space I between the two apertures 40, 60. The apertures 40 and 60 may be slightly offset to allow the bottle 200 to "turn the corner" when being inserted into the housing 10 without getting "held-up" by the edges and surfaces defining the apertures 40, 60. The apertures 60 in the top plate 50 are approximately 5.75 cm in diameter, while the apertures 40 in the retaining plate 30 are approximately 5.5 cm in diameter, for a 5 cm diameter upper portion 224 and a 5 cm diameter lower portion 226 respectively. Thus, the preferred apertures 40 and 60 are approximately between 0.25 cm-2 cm larger than the upper portion 224 of the bottle 200 and the apertures 60 are approximately 0.25-1 cm larger than the lower portion 226 of the bottle 200.

The edges and surfaces defining the apertures 40 in the retaining plate 30 tend to resist lateral and downward movement, while the edges and surfaces defining the apertures 60 in the top plate 50 tend to act more as support structure to keep the bottles 200 from tipping over. It is the combination of the diameters and positioning of the apertures 40, 60 that allow the bottle(s) 200 to slide into the housing 10, but not slide out. Additionally, the abutment against said edges/surfaces, of the bottle 200 near the bend 228 prevents the bottle from sliding out of the aperture(s) 40 in the retaining plate 30. If the top plate 50 were eliminated and/or the diameters of the apertures 60 in the top plate were enlarged so greatly, and assuming the mounting plate 20 was not in the way, the bottle(s) 200 could tip over in any direction due to not being supported vertically, and slide out of the aperture(s) 40 in the retaining plate 30. Additionally, if the diameter of the aperture(s) 40 in the retaining plate 30 is too large, then the bottle(s) 200 may also slide out because the edges/surfaces of the aperture(s) 40 would no longer be able to "catch" or retain the bend 228 in the bottle(s) 200. If the diameters of the apertures 40, 60 were too small, then it would be too difficult to get the bottles 200 in the housing 10 without damage to the bottles 200.

The edges and surfaces defining the apertures 40 and 60 may be considered "sleeves" that capture the bottles 200 and prevent them from "falling out" of the housing 10. In effect, the sleeves are generally cylindrical-like structures formed by the top plate 50 and retaining plate 30 due to the retaining 30 and top 50 plates having a depth. The sleeves formed by cutting the apertures 40 in the retaining plate 30 have a sleeve surface 95, comprising an upper portion that is generally the half of the cylinder nearer the inner face 32 of the retaining plate 30, and a lower portion that is generally the other half of the cylinder nearer the outer face 34 of the retaining plate 30. Preferably, the upper portion has an upper front edge 42 and an upper rear edge 44, and the lower portion has a lower front edge 46 and a lower rear edge 48. The sleeves formed by cutting the apertures 60 in the top plate 50 have a sleeve surface 90, comprising an upper portion that is generally the half of the cylinder nearer the outer face 54 of the top plate 50, and a lower portion that is generally the other half of the cylinder nearer the inner face 52 of the top plate 50. Preferably, the upper portion has an upper front edge 62, and an upper rear edge 64, and the lower portion has a lower front edge 66 and a lower rear edge 68. The upper and lower rear edges 44, 64 and 48, 68 respectively of apertures 40, 60 are generally each half the circumference of the apertures 40, 60, as are the opposing upper and lower front edges 42, 62 and 46, 66 respectively.

In the preferred embodiment, each bottle 200 is preferably held in the housing 10 by contacting the sleeve surfaces 90, 95, at three points: at the upper rear edge 64 of the top plate aperture 60, at the upper front edge 42 of the retaining plate 30 aperture 40, and at the lower rear edge 48 of the retaining plate 30 aperture 40. The bottle(s) 200 may not be exactly vertically oriented in the housing 10, as shown in FIG. 9A, as the bottles 200 tend to "lean back" due to the bend 228, and abut the upper rear edge 64 of the top plate aperture 40.

The bottles 200 are preferably not held in the housing 10 with any latches, braces, clamps, locks, or other complex securement means except the sleeve surfaces 90, 95 defining the apertures. Preferably, there are no securement means that extend around or partially around the neck 216 or shoulder 218 portions of the first end 210 of the bottle 200.

The sleeve surfaces 90, 95 are slightly larger than the diameter of the body 220 of the bottle(s) 200 in order to provide a "tight" fit around the bottles 200 and to provide substantial structure around the bottles 200 to maintain stability, but not so tight that the bottles can't slide into the sleeves. Due to the close circumferences of both the bottle(s) 200 and the sleeve surfaces 90, 95, it appears that the bottle contacts the sleeve surfaces 90, 95 at edges 64, 42, and 48 along less than 45 degrees of the circumference of the sleeve(s), and more preferably less than 20 degrees of the circumference of the sleeve(s). Therefore, the total abutment surface is less than 135 degrees and more preferably less than 60 degrees. However, due to the preferable cylindrical nature of the bottle(s) 200 being smaller in diameter than the apertures 40, 60, the bottle(s) 200 ideally only contact the sleeve surfaces 90, 95 at a line or point at the upper rear edge 64 of the top plate apertures 60, at the upper front edge 42 of the retaining plate 30 apertures 40, and at the lower rear edge 48 of the retaining plate 30 apertures 40.

The inner faces 22, 32, 52 and 72 of the mounting plate, retaining plate, top plate and side plates respectively define an interior space I for receiving a portion of the main body 220 of the bottle 200. Preferably, a portion of the second end 230 of the bottle remains "outside" the interior space I of the housing 10 so that the bottle 200 can be easily grabbed and removed from the housing for refilling or cleaning. The first end 210 of the bottle 200 also remains outside of the interior space I of the housing 10 so that the animals may access the nipple 214 for feeding.

Figure 8:
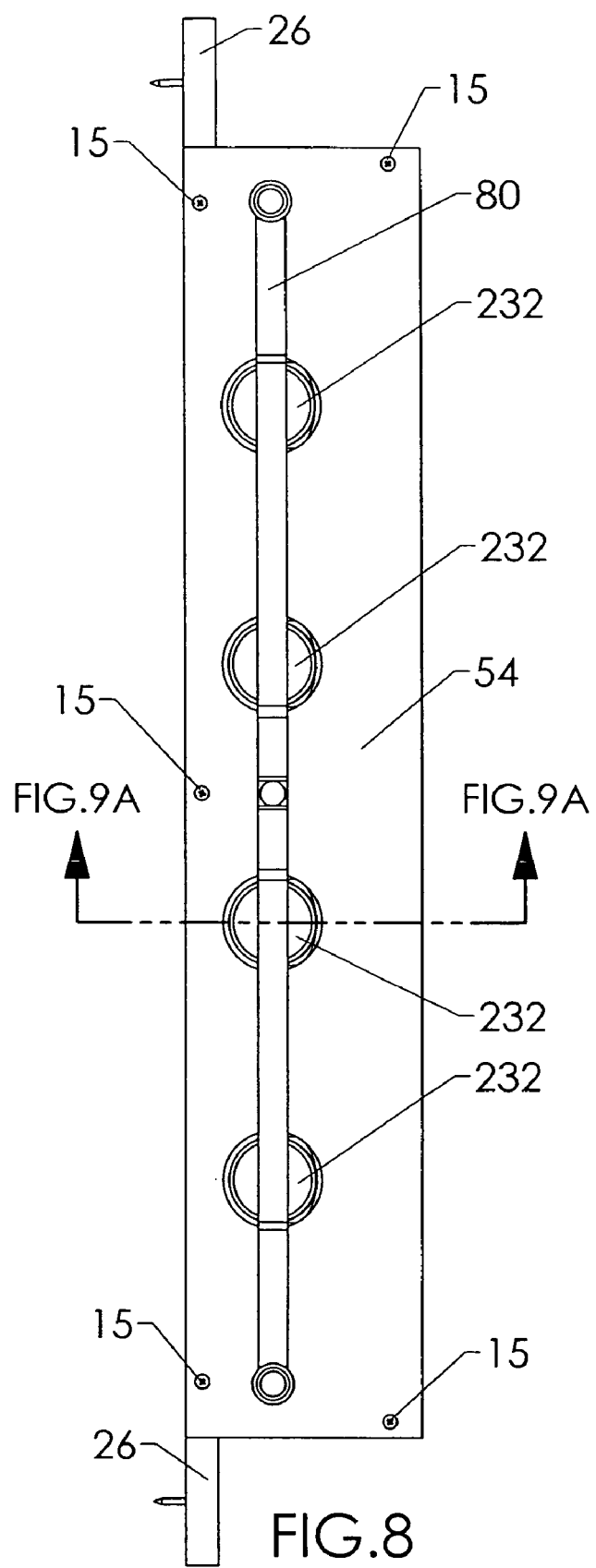
FIG. 8 is a top view of the embodiment shown in FIGS. 1, 2 and 4-7.
Figure 10:
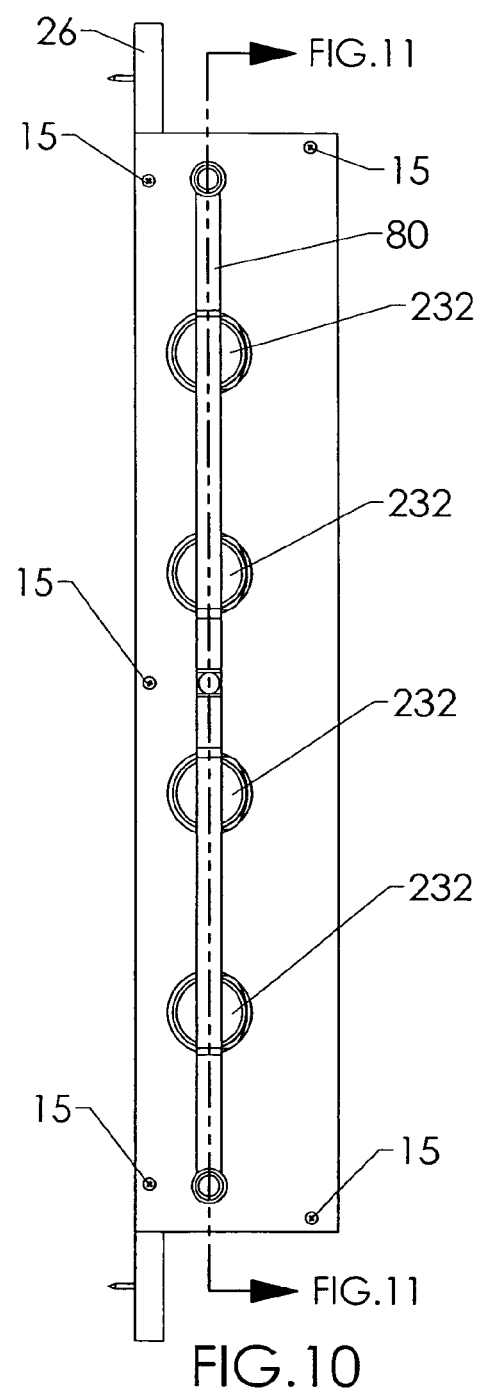
FIG. 10 is a top view of the embodiment shown in FIGS. 1, 2 and 4-8.
Figure 11:
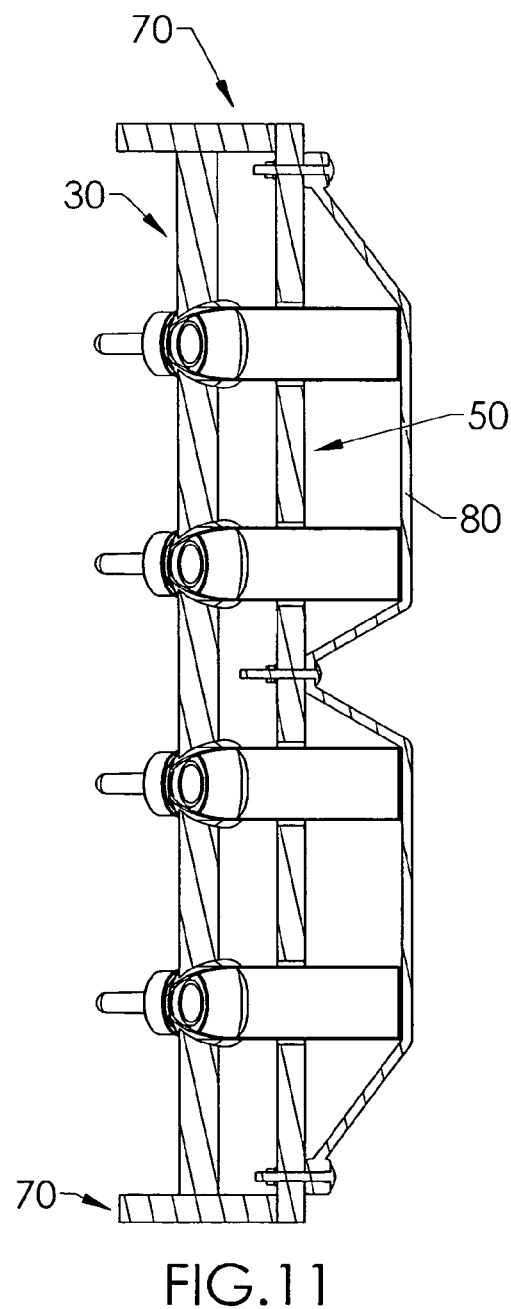
FIG. 11 is a cross-sectional view of the embodiment shown in FIG. 10, viewed along the line 11-11 in FIG. 10.

As shown to best advantage in FIGS. 8 and 10, a retaining strap 80 extends across the flat portion 232 of the bottles 200. The retaining strap 80 is preferably made of a durable rubber; however, other flexible, resilient or elastic materials may be used. Alternatively, a non-resilient member or members may be used to retain the bottle(s) 200 in the housing 10. The retaining strap 80 permits easy access to the bottles 200 by being easily "slid" off the flat portion 23 of the bottles and then the bottles 200 may be removed from the housing 10. The retaining strap 80 also serves to simulate natural feeding. As the lambs or other small animals feed, they tend to "bunt" against the bottle much like they would do to their mother when nursing. The resiliency, substantial yielding, and elasticity of the strap 80 allows the animal to "bunt" against the bottle without dislodging the bottle so that the bottle is supported, but does not create a rigid body dissimilar to a female sheep or other female animal's udder. The strap 80 is preferably attached to the housing with bolts 82 that extend through the outer face 54 of the top plate 50 of the housing 10. The bolts 82 are preferably positioned every two bottles 200 to make it easier to remove the bottles 200; however, the bolts 82 may be positioned more or less frequently along the strap 80.

Although the preferred arrangement of the plates 20, 30, 50, 70 has been described above, the feeding station 100 may include only the retaining plate 30 and the top plate 50. The retaining plate 30 and top plate 50 may be secured together at an angle and then attached to a vertical member by means of screws, nails, hanging devices, or other attachment means that attach to either the retaining plate 30, the top plate 50 or both. This is a less preferred embodiment as it is easier to secure only the mounting plate 20 to a vertical member versus trying to secure both the retaining plate 30 and the top plate 50. Additionally, it is less stable and strong due to the reduction in structure that supports the feeding station. Alternatively, the feeding station 100 may be manufactured to have less plate structure, for example, discontinuous plates, racks, guides, or other discontinuous structure that forms sleeves which contact the circumferences of the upper portion 224 and the lower portion 226 of the bottle.

Although this invention has been described above with reference to particular means, materials and embodiments, it is to be understood that the invention is not limited to these disclosed particulars, but extends instead to all equivalents within the scope of the following claims.

We claim:

1. A feeding station for holding one or more bottles comprising:
   a housing having a retaining plate and a top plate, wherein said top plate and said retaining plate are at an angle to one another;
   wherein the top plate and the retaining plate each comprise an aperture, the aperture of the top plate and the aperture of the retaining plate being generally vertically aligned, but not coaxial;
   wherein the feeding station further comprises a bottle received in said apertures, and wherein the bottle has an angular configuration; and
   wherein the apertures are defined by sleeve surfaces that contact the bottle at three points.

2. A feeding station as in claim 1, wherein the top plate and the retaining plate are secured to a mounting plate, and wherein the retaining plate and the mounting plate are at an angle.

3. A feeding station for holding one or more bottles comprising:
   a housing having a retaining plate and a top plate, wherein said top plate and said retaining plate are at an angle to one another;
   wherein the top plate and the retaining plate each comprise an aperture, the aperture of the top plate and the aperture of the retaining plate being generally vertically aligned, but not coaxial;
   wherein the feeding station further comprises a bottle received in said apertures, and wherein the bottle has an angular configuration; and
   wherein a resilient strap releasably retains the bottle in said housing.

4. A feeding station for holding one or more bottles comprising:
   a housing having a retaining plate and a top plate, wherein said top plate and said retaining plate are at an angle to one another, the top plate and the retaining plate are secured to a mounting plate, and the retaining plate and the mounting plate are at an angle to one another;
   wherein the top plate and the retaining plate each comprise an aperture, the aperture of the top plate and the aperture of the retaining plate being generally vertically aligned, but not coaxial;
   wherein the feeding station further comprises a bottle received in said apertures, and wherein the bottle has an angular configuration; and
   wherein the angle between the mounting plate and retaining plate and the angle between the retaining plate and the top plate generally correspond to an angle in the bottle.

5. A feeding station comprising a housing having:
   a mounting plate;
   a retaining plate at a first angle to said mounting plate;
   a top plate at a second angle to said retaining plate and at a third angle to said mounting plate;
   wherein said retaining plate and said top plate each comprise at least one aperture defined by a sleeve surface, and wherein said aperture in the top plate and said aperture in the retaining plate are generally vertically aligned; and
   a bottle in said apertures, wherein said bottle has an angular configuration.

6. A feeding station as in claim 5, wherein said aperture in the top plate and the aperture in the retaining plate are generally cylindrical and not coaxial.

7. A feeding station as in claim 5, wherein said housing further comprises two side plates one on each side of the housing extending perpendicularly from the mounting plate and adjacent the retaining plate.

8. A feeding station as in claim 7, wherein the mounting plate, the retaining plate, the top plate and the two side plates each comprise and inner face, and wherein said inner faces define and interior space configured to receive a portion of said bottle.

9. A feeding station as in claim 5, wherein the bottle comprises a first end adapted for feeding, a main body portion having an upper portion, a lower portion and a bend between said upper and lower portions, and a second end.

10. A feeding station as in claim 9, wherein a portion of said sleeve surface in the top plate contacts the main body of the bottle at one point, and wherein a portion of said sleeve surface in the retaining plate contacts the main body of the bottle at two points.

11. A feeding station as in claim 10, wherein the main body of the bottle contacts an upper rear edge of the sleeve surface in the top plate, an upper front edge and a lower rear edge of the sleeve surface in the retaining plate.

12. A feeding station as in claim 10, wherein the main body of the bottle contacts only an upper rear edge of the sleeve surface in the top plate, an upper front edge and a lower rear edge of the sleeve surface in the retaining plate.

13. A feeding station as in claim 9, wherein a strap extends over the second end of the bottle.

14. A feeding station as in claim 9, wherein the main body of the bottle and the sleeve surfaces are generally cylindrical.

15. A feeding station as in claim 5, wherein the first, second, and third angles form a right triangle.

16. A feeding station for holding at least one bottle for holding liquid, the bottle having an angled main body, and the feeding station comprising:
   an upper plate having a generally cylindrical upper aperture, having a first central axis perpendicular to the plane of the upper plate;
   a lower plate having a generally cylindrical lower aperture, having a second central axis perpendicular to the plane of the lower plate;
   wherein the upper and lower plates are at an angle to each other ranging from 30-60 degrees to each other; and
   wherein said first axis and said second axis intersect in an interior space between the upper and lower plate.

17. A feeding station as in claim 16, further comprising a bottle received in said apertures, and wherein the bottle has an angular configuration between 20 and 45 degrees.

18. A feeding station as in claim 17, wherein the bottle contacts the upper aperture only at an upper rear edge of the upper aperture, and wherein the bottle contacts the lower aperture only at an upper rear edge and a lower front edge of the lower aperture.

* * * * *